May 31, 1966   W. F. SOUTHWELL ETAL   3,253,824
APPARATUS FOR SEPARATING PIECES FROM A STACK, AND THE LIKE
Filed Nov. 18, 1964   12 Sheets-Sheet 1

INVENTORS
WYNDHAM F. SOUTHWELL
NICHOLAS WEHRMANN

BY Morrison, Kennedy Campbell
ATTORNEYS

May 31, 1966    W. F. SOUTHWELL ETAL    3,253,824
APPARATUS FOR SEPARATING PIECES FROM A STACK, AND THE LIKE
Filed Nov. 18, 1964    12 Sheets-Sheet 2

INVENTORS
WYNDHAM F. SOUTHWELL
NICHOLAS WEHRMANN

BY Morrison, Kennedy & Campbell
ATTORNEYS

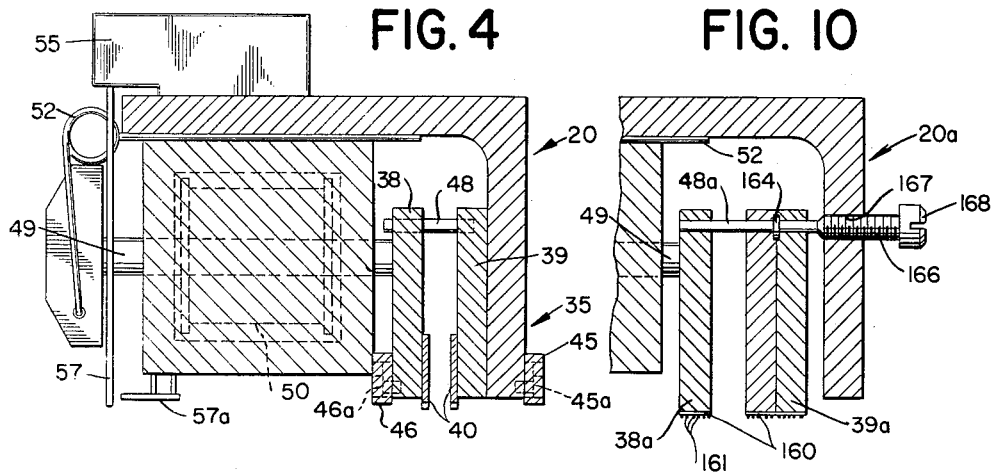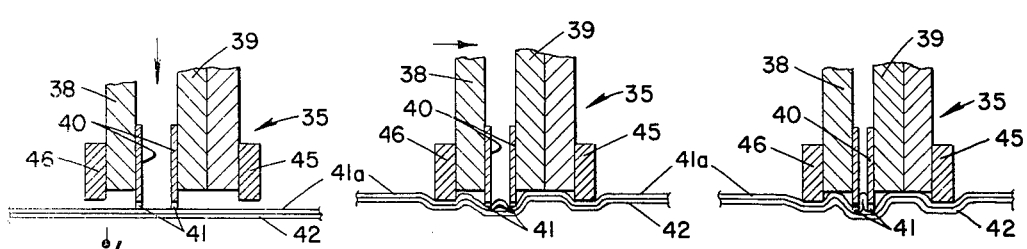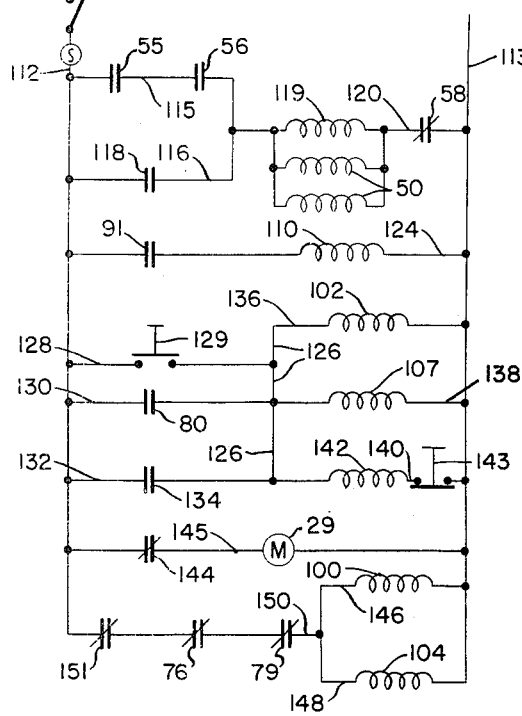

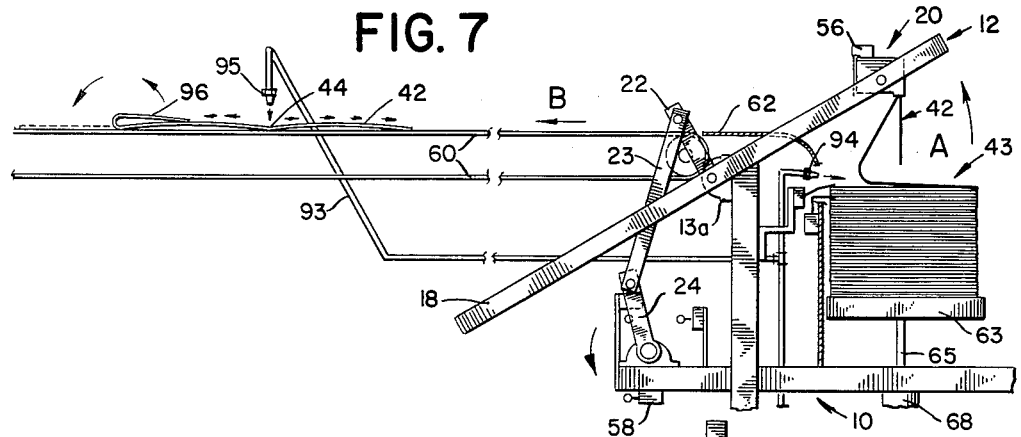
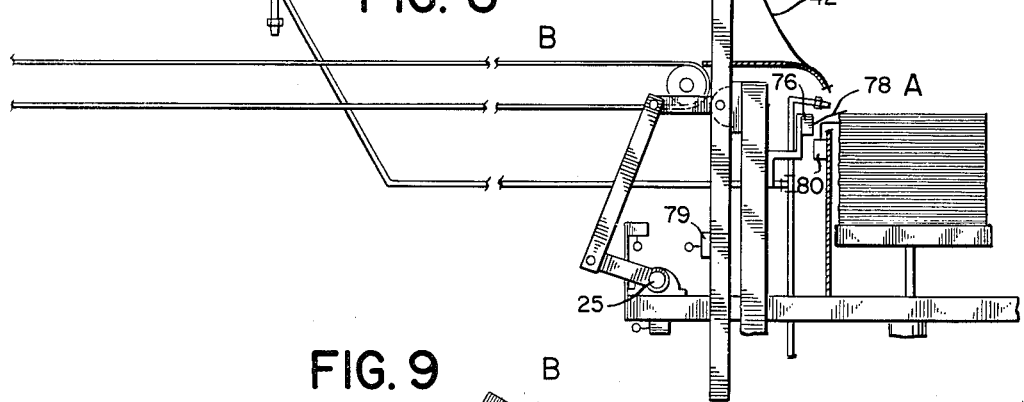
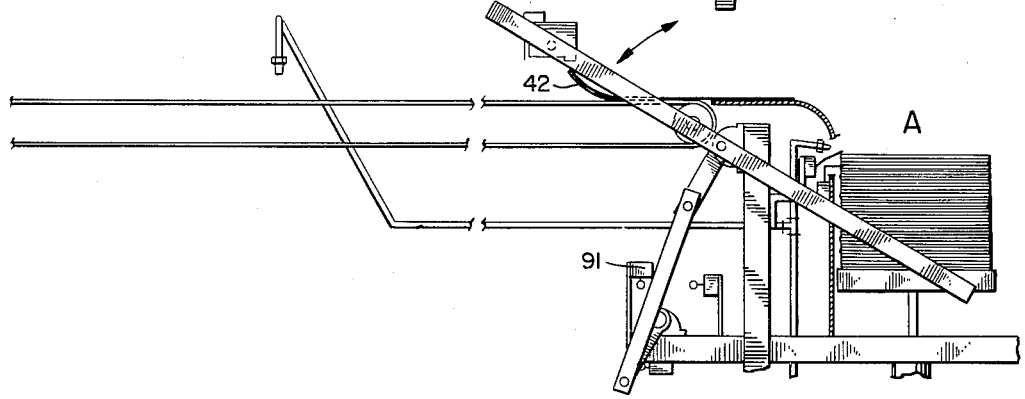

May 31, 1966 W. F. SOUTHWELL ETAL 3,253,824
APPARATUS FOR SEPARATING PIECES FROM A STACK, AND THE LIKE
Filed Nov. 18, 1964 12 Sheets-Sheet 5

*INVENTORS*
WYNDHAM F. SOUTHWELL
NICHOLAS WEHRMANN
BY *Morrison, Kennedy & Campbell*
ATTORNEYS May 31, 1966     W. F. SOUTHWELL ET AL     3,253,824
APPARATUS FOR SEPARATING PIECES FROM A STACK, AND THE LIKE
Filed Nov. 18, 1964     12 Sheets-Sheet 6
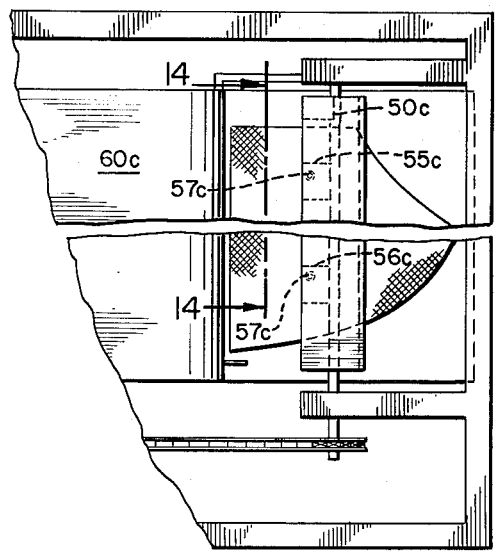
FIG. 13
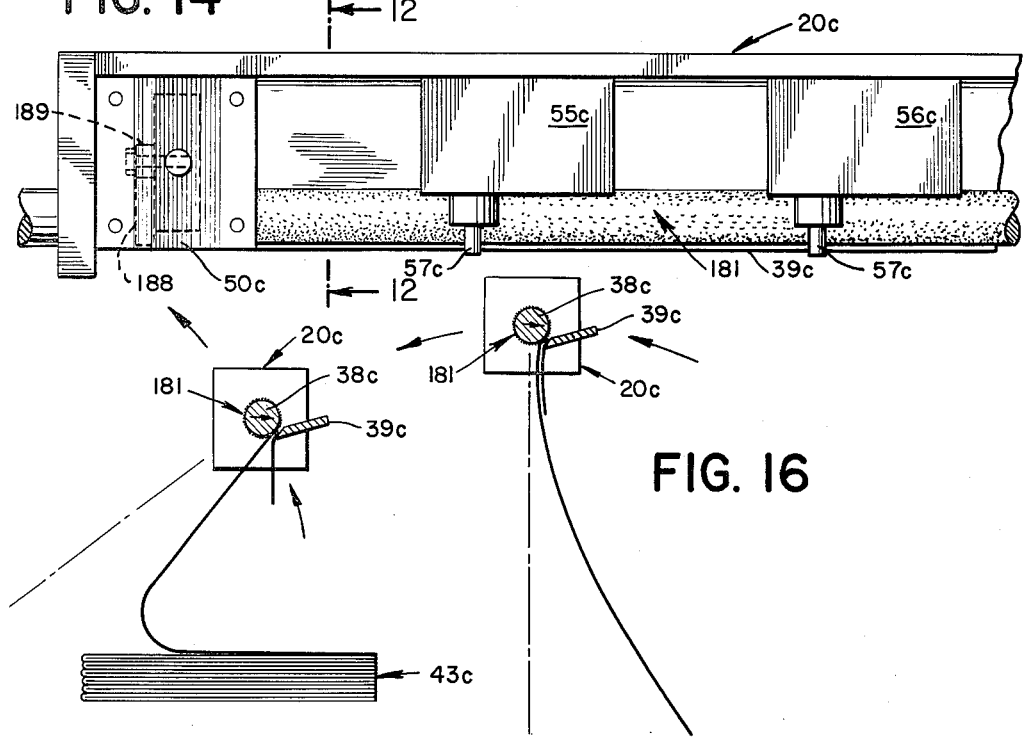
FIG. 14
FIG. 15
FIG. 16
INVENTORS
WYNDHAM F. SOUTHWELL
NICHOLAS WEHRMANN
BY Morrison, Kennedy & Campbell
ATTORNEYS

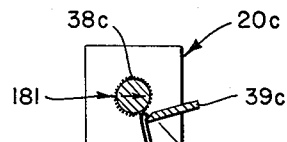
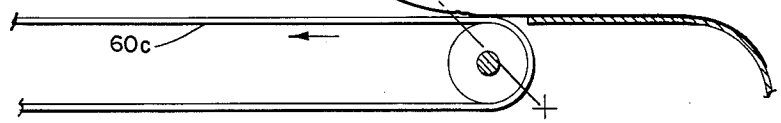
FIG. 17
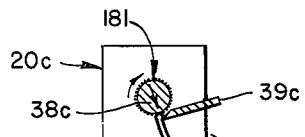
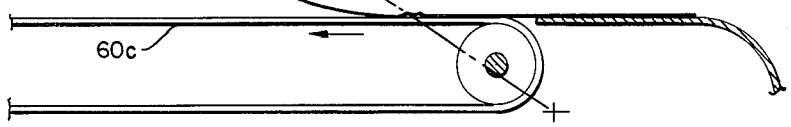
FIG. 18
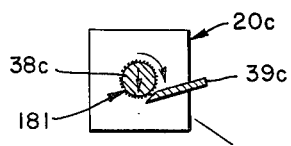
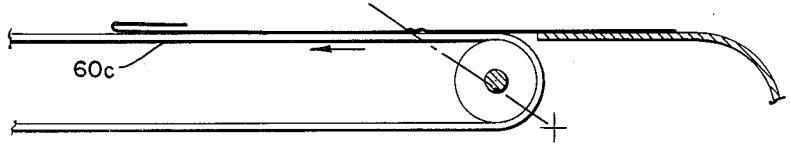
FIG. 19

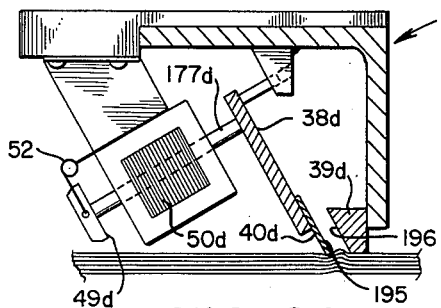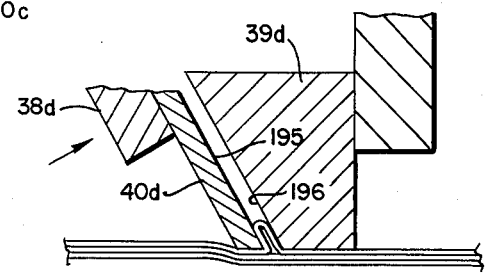
FIG. 20   FIG. 21
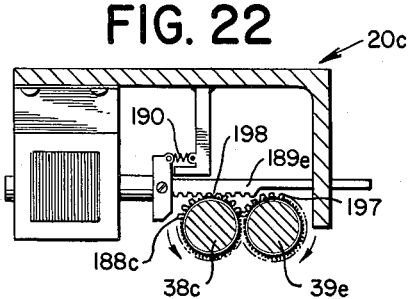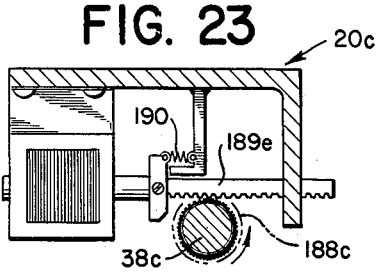
FIG. 22   FIG. 23
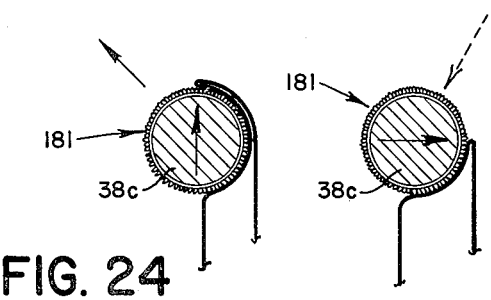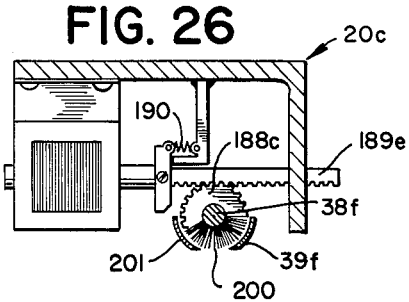
FIG. 24   FIG. 26
FIG. 25
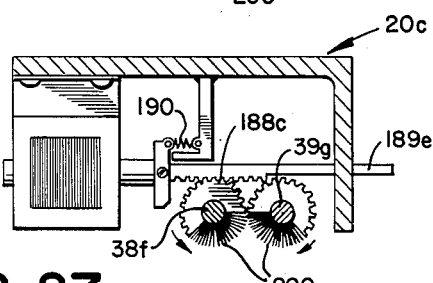
FIG. 27

May 31, 1966  W. F. SOUTHWELL ETAL  3,253,824
APPARATUS FOR SEPARATING PIECES FROM A STACK, AND THE LIKE
Filed Nov. 18, 1964  12 Sheets-Sheet 9
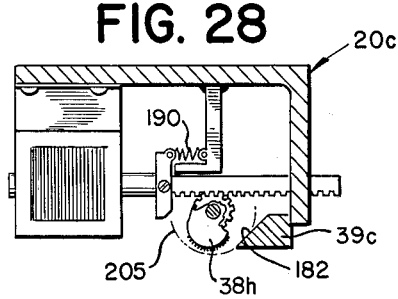
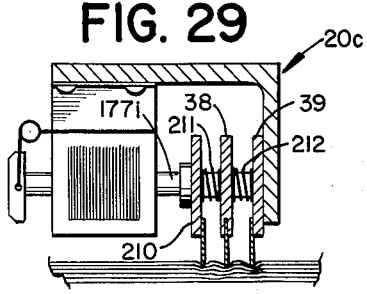
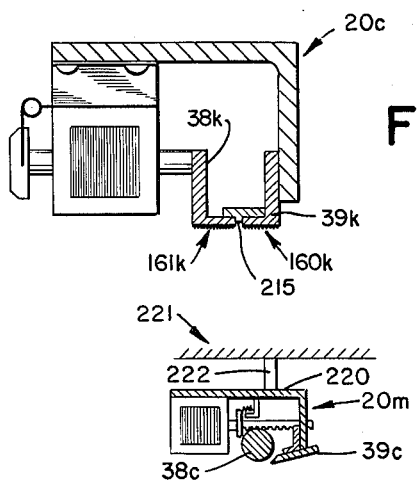
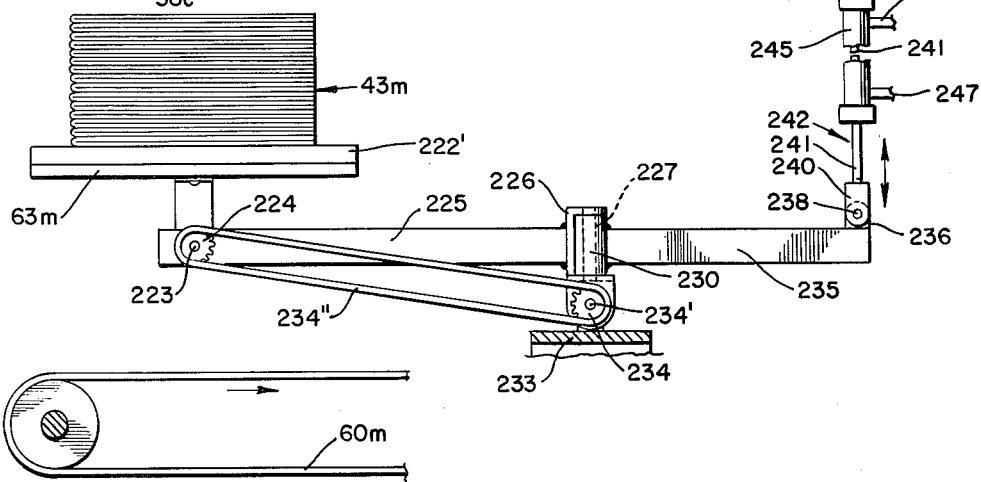
INVENTORS
WYNDHAM F. SOUTHWELL
NICHOLAS WEHRMANN
BY *Morrison, Kennedy & Campbell*
ATTORNEYS

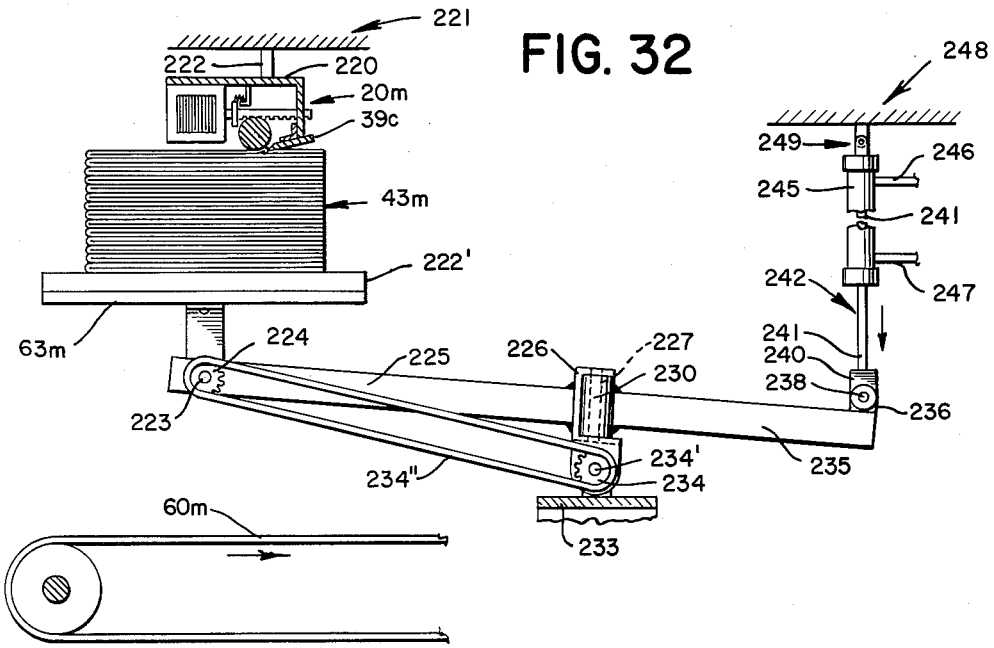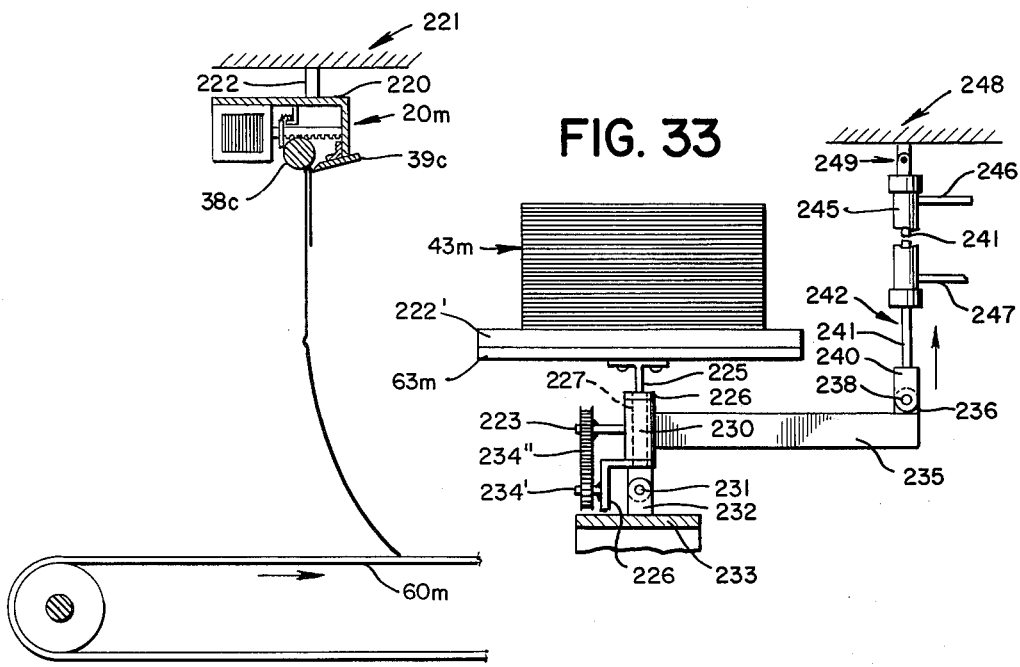

May 31, 1966  W. F. SOUTHWELL ETAL  3,253,824
APPARATUS FOR SEPARATING PIECES FROM A STACK, AND THE LIKE
Filed Nov. 18, 1964  12 Sheets-Sheet 11

INVENTORS
WYNDHAM F. SOUTHWELL
NICHOLAS WEHRMANN
BY *Morrison, Kennedy & Campbell*
ATTORNEYS May 31, 1966   W. F. SOUTHWELL ETAL   3,253,824
APPARATUS FOR SEPARATING PIECES FROM A STACK, AND THE LIKE
Filed Nov. 18, 1964   12 Sheets-Sheet 12
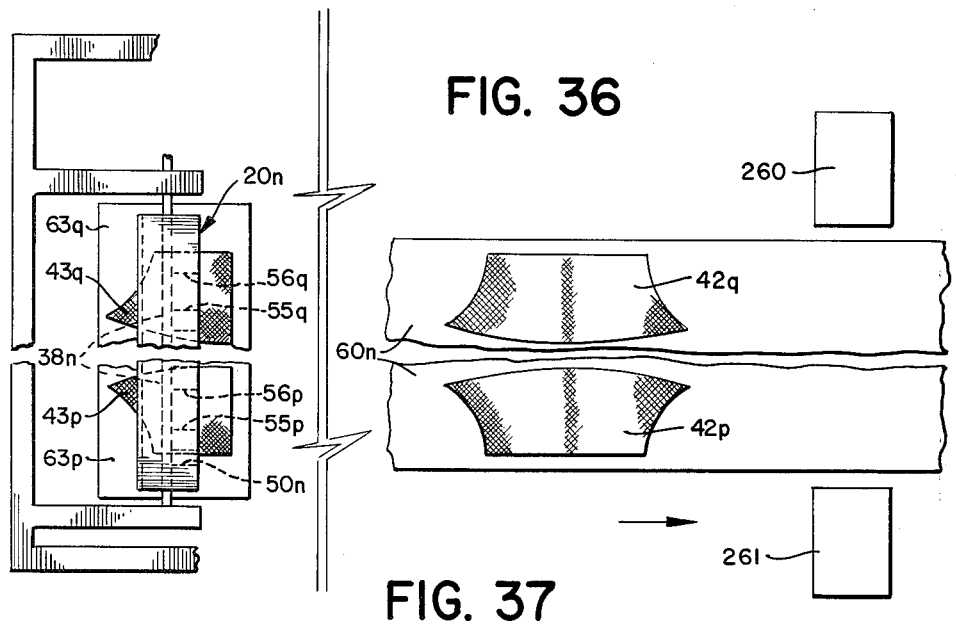
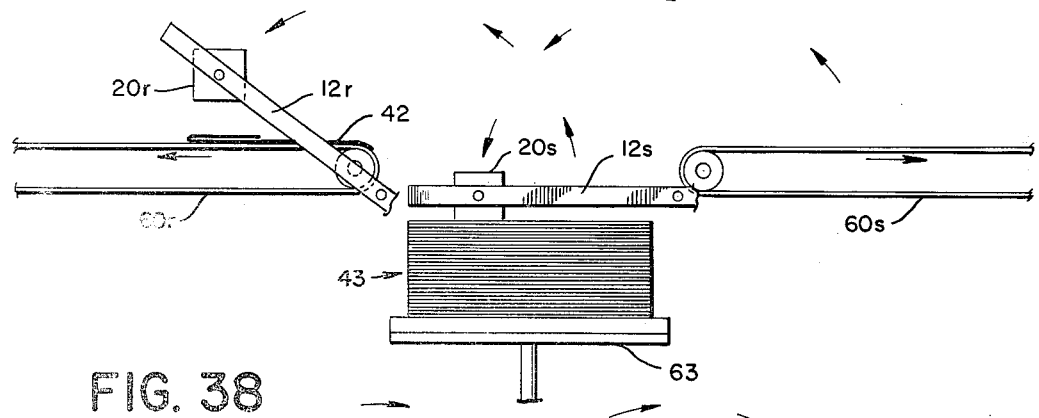
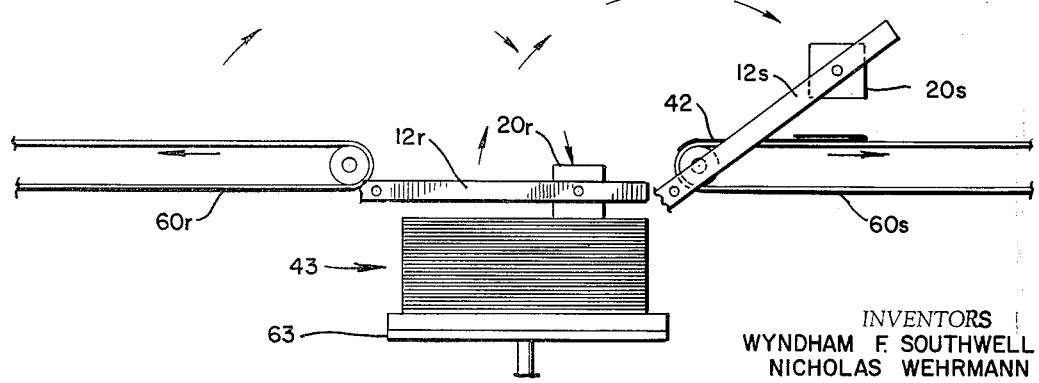
INVENTORS
WYNDHAM F. SOUTHWELL
NICHOLAS WEHRMANN
BY *Morrison, Kennedy & Campbell*
ATTORNEYS

United States Patent Office 3,253,824
Patented May 31, 1966

3,253,824
APPARATUS FOR SEPARATING PIECES FROM A STACK, AND THE LIKE
Wyndham F. Southwell, Wilkesboro, and Nicholas Wehrmann, North Wilkesboro, N.C., assignors to L & L Manufacturing, Inc., a corporation of Delaware
Filed Nov. 18, 1964, Ser. No. 412,103
25 Claims. (Cl. 271—19)

This application is a continuation-in-part of our co-pending application Serial No. 351,445, filed March 12, 1964 (now abandoned).

This invention relates to separating fabric pieces from a stack therof, and, in various of its more specific aspects, to mechanisms and processes for the picking up of fabric pieces, for the transporting of such pieces to a remote spot, the depositing of the pieces on a fabric-piece receiving surface—such as a conveyor—and/or the smoothing and arranging thereof on the conveyor or other surface. In various of its more specific aspects it is particularly concerned with separating folded fabric pieces, such, for example, as folded blanks for T-shirt sleeves, from a stack of such pieces which may, for example, have been provided by cutting a stack of such pieces from one side of a stack of tubular knitted fabric so that the pieces are each double-layered with a fold on that side. The top layer on the stack, whether the upper layer of a plural-ply piece, or the single layer of a single-ply piece.

Among the objects of the invention are the picking up one-by-one and transporting of fabric pieces, particularly of knitted or woven fabric pieces, and especially of folded fabric pieces, in an effective and uniform manner and in such a way that they may be laid upon a surface—e.g. the surface of a conveyor—with the major portion thereof generally flat on the surface and original folds therein—if any—unfolded, and where necessary, arranging and/or smoothing the same flat or in other desired manner on the surface.

Among the features of the invention are the provision of improved pick-up mechanism, improved transporting, positioning, and release mechanism, improved stack-supporting means, which are preferably of the air cushion type, means for decreasing the adherence tendencies of fabric pieces on the stack, means for ejecting a picked-up piece of fabric in a controlled manner, and/or improved means for maintaining the top of the stack generally in the vicinity of a given level as fabric pieces are removed therefrom.

The invention accordingly comprises apparatus embodying the features of construction, combinations of elements, and arrangement of parts, and the several steps and the relation and order of one or more of such steps with respect to each of the others, all of which are exemplified in the foregoing detailed disclosure, and the scope of the application of which will be indicated in the claims.

For a fuller understanding of the nature and objects of the invention, reference should be had to the following detailed description taken in connection with the accompanying drawings, in which FIGURE 1 is a perspective view, with certain parts omitted, of one form of mechanism embodying the invention;
FIG. 2 is a plan view thereof;
FIG. 3 is a side view thereof, partly in section;
FIG. 4 is a fragmentary sectional view on a larger scale along the line 4—4 of FIG. 2;
FIG. 4a is a fragmentary view showing the fabric pick-up elements contacting a fabric piece;
FIG. 4b is a similar view showing the parts when the pick-up elements have penetrated into the top layer of a fabric piece and are in the process of pinching it between them;
FIG. 4c is a similar view showing the fabric piece pinched between the pick-up elements;
FIG. 5 is an enlarged fragmentary view of the top of the stack;
FIG. 6 is a diagrammatic showing of the operating circuit;
FIG. 7 is a skeletal view of the mechanism at a stage where one fabric piece is in position to be smoothed out on a conveyor and another fabric piece is being initially withdrawn from the stack;
FIG. 8 is a similar view showing the withdrawn fabric piece being moved toward the conveyor;
FIG. 9 is a similar view showing the withdrawn fabric piece just after its release by the pick-up elements;
FIG. 10 is a view similiar to FIG. 4 showing a modification;
FIG. 11 is a view similar to FIG. 4 showing another embodiment of the invention;
FIG. 12 is a generally similar view showing still another embodiment of the invention;
FIG. 12a is a view similar to FIG. 4a showing the mechanism of FIG. 12 engaging a fabric piece;
FIG. 12b is a view similar to FIG. 4b showing a further step in the operation of the mechanism of FIG. 12;
FIG. 12c is a view similar to FIG. 4c showing a further step in the operation of the mechanism of FIG. 12;
FIG. 13 is a plan view of the mechanism of FIG. 12 when in the position of FIG. 12a;
FIG. 14 is a vertical sectional view thereof at right angles to that of FIG. 12;
FIG. 15 is a diagrammatic view showing an early stage of a withdrawal operation of the mechanism of FIG. 12;
FIG. 16 is a similar view showing a further stage in which an entire previously folded piece has been lifted;
FIG. 17 is a similar view showing a further stage in which a releasing action is about to be initiated;
FIG. 18 is a similar view showing a further stage in which the fabric piece is being ejected;
FIG. 19 is a similar view showing a further stage wherein the fabric piece has been ejected;
FIG. 20 is a diagrammatic view of an arrangement wherein a gripping element movable in a straight line may pick up a fabric piece by an action having a lifting component;
FIG. 21 is a similar view showing the gripping elements of FIG. 20 in fabric-gripping relationship;
FIG. 22 is a diagrammatic view of an arrangement designed to pinch a fabric piece between two pick-up elements each rotatable on its own axis;
FIG. 23 is a diagrammatic detail view showing a modification of mechanism such as shown in FIG. 12 wherein the fabric is lifted and held only by a clinging action to a single pick-up element;
FIG. 24 is a similar view showing the picked-up fabric;
FIG. 25 is a similar view showing the release of the fabric;
FIG. 26 is a similar view showing a modified form of rotatable pick-up element;
FIG. 27 is a similar view showing two cooperative rotary pick-up elements of the character of the rotary element of FIG. 26;
FIG. 28 is a similar view showing a pick-up element swinging an eccentric axis;
FIG. 29 is a view of an arrangement having, in addition to a pair of jaws mounted for relatively straight-line movement, there is provided an additional jaw so that a double pinching action is provided;
FIG. 30 is a similar view showing an arrangement providing means for limiting the relative movement of the jaws;

FIG. 31 is a vertical sectional view of an arrangement having a stationary pick-up head and a horizontally movable stack-supporting means;

FIG. 32 is a similar view showing the parts in fabric pick-up position;

FIG. 33 is a similar view showing the parts in fabric releasing position;

FIG. 36 is a plan view of the same;

FIG. 37 is a side view of an arrangement for successively picking-up fabric pieces from a single stack and depositing them on different conveyors; and FIG. 38 is a similar view showing a succeeding operation.

Figure 1:
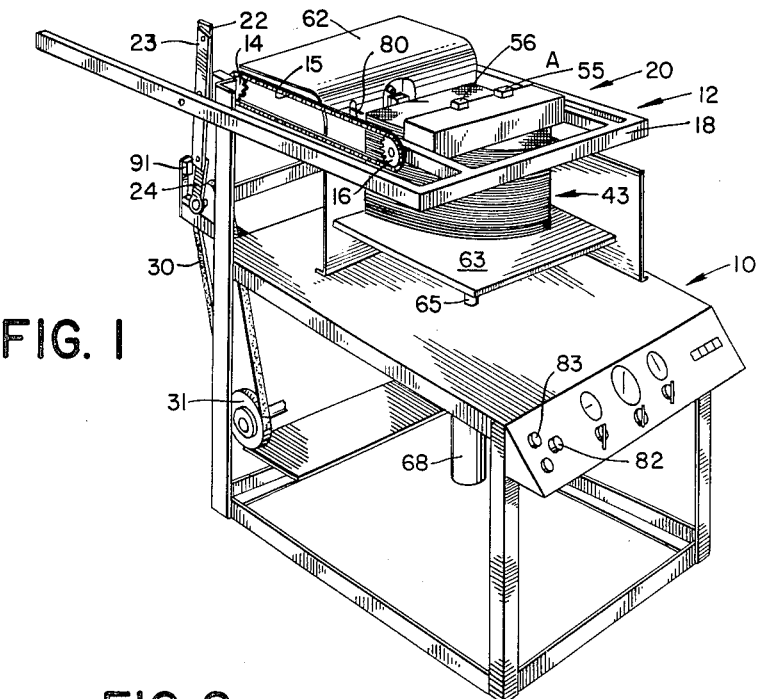
Figure 2:
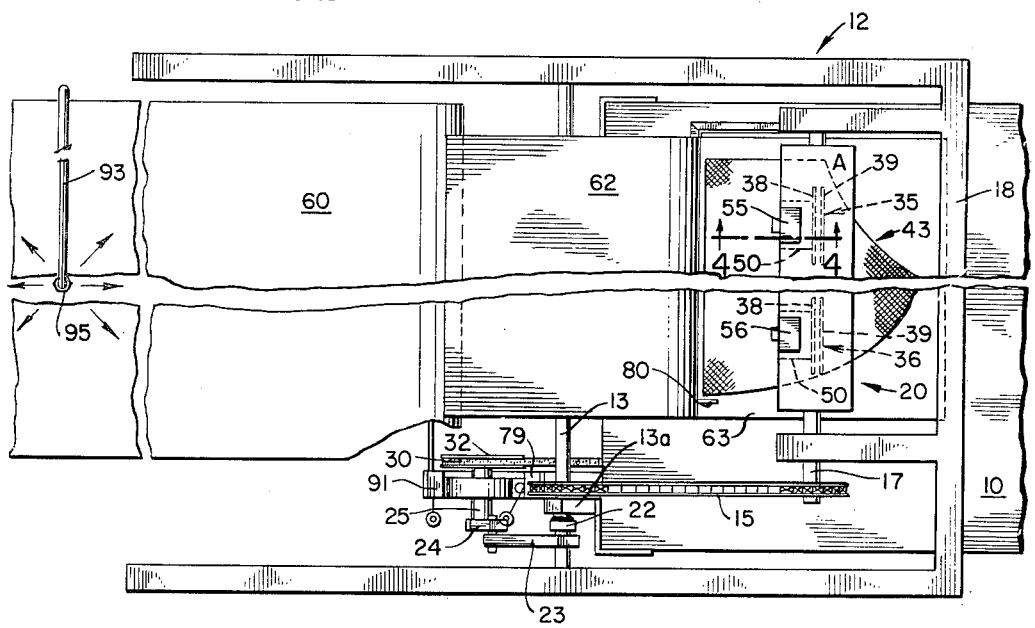
Figure 3:
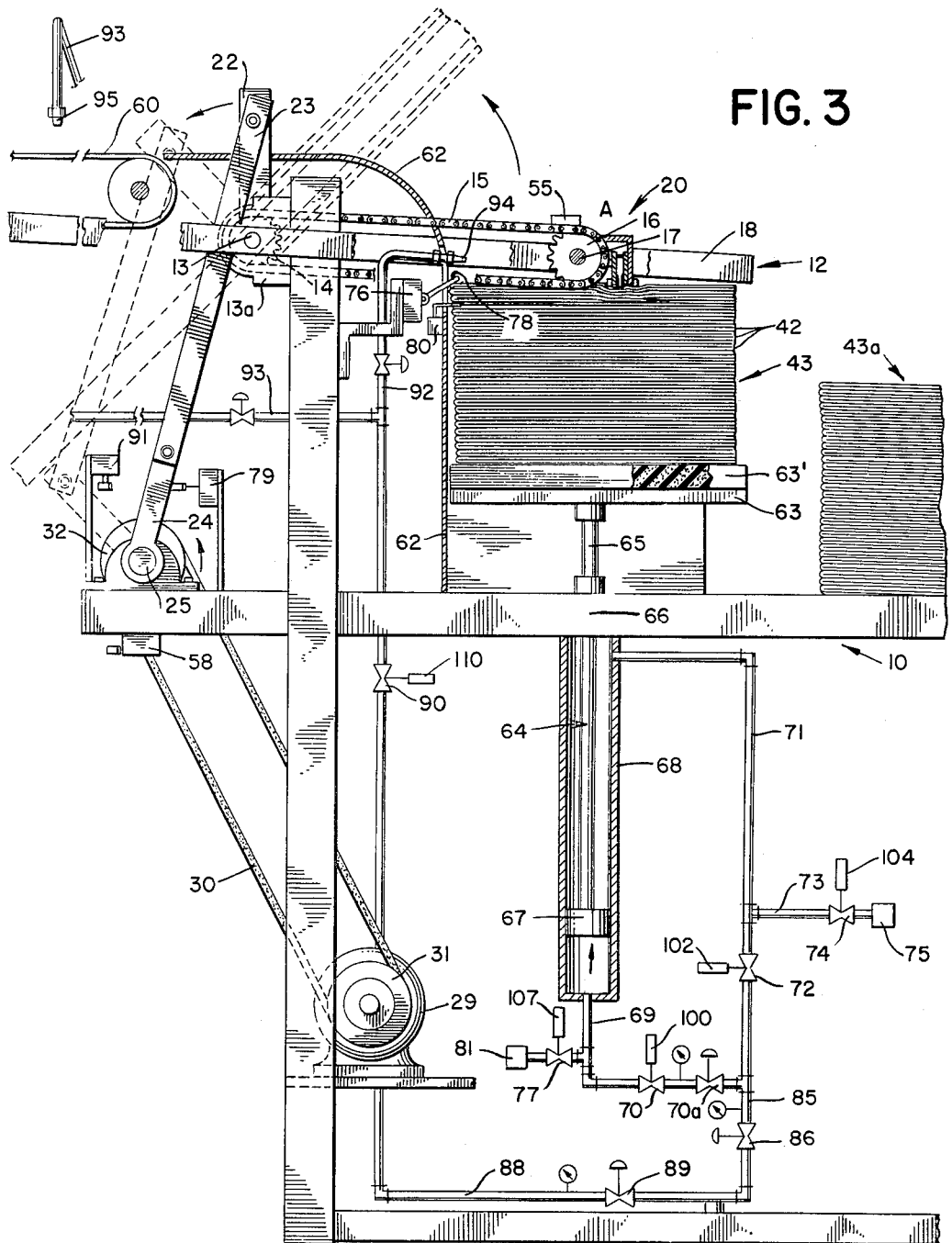

In the form of the apparatus exemplified in FIGS. 1–9—in connection with the description of which the process is also exemplified—there is provided a frame generally designated by the numeral 10. A beam 12 is swingingly supported by shaft 13 journalled at 13a to the frame. Mounted on the shaft 13 and fixed to the frame 10 is a sprocket 14 over which there extends a chain 15 extending to a sprocket 16 fixed on a shaft 17 rotatably supported from a cross-piece 18 near the free end of the beam 12. Fixed to the shaft 17 is a pick-up head 20 which, due to the provision of the chain and its sprockets, is caused to turn with respect to the beam and is thus prevented from turning with respect to the floor when the beam is swung and thus will have its lower side down and will be in the same relationship to the earth's gravity at all times, so as to pick up, transport, and release a fabric piece while the fabric piece hangs below it.

To the beam there is fixed a crank arm 22 to which is pivoted one end of a link 23 the other end of which is pivoted to the end of a crank arm 24 which is fixed to a shaft 25, the effective lengths and relationships of the elements 22, 23, and 24 being such as to move the arms 12 and the head 20 to carry the head 20 between a pick-up position at A (FIGS. 1, 2, and 3) and a release position at B (FIG. 9). The shaft 25 is driven at a constant predetermined speed—e.g. ten to thirty (preferably eighteen) revolutions per minute—from a motor 29 by transmission means including a belt 30 running on pulleys 31 and 32. In the present instance there is employed a one-tenth horse-power motor equipped with a speed reduction means, and adjustable supplemental speed reduction means (not shown) are provided. The pick-up head 20 carries one or, preferably, more pick-up units (two such units being exemplified at 35 and 36). Each pick-up unit comprises a pair of jaws 38 and 39, at least one of which (the jaw 38 in the present instance) is movable toward the other. Either on the movable jaw (or on each of the jaws, as in the present instance) is a pick-up element 40 which as exemplified is in the form of a hack saw blade and is arranged to contact (FIG. 4a) push down upon, and frictionally engage (and in the present instance to penetrate, as by means of teeth 41) the top layer 41a of the top one of folded pieces 42 of fabric on a stack 43 (or the top piece of unfolded fabric) and then to push it toward the other jaw to cause it to hump up (FIG. 4b) and then to be pinched between the jaws (FIG. 4c). In the present instance, each piece 42 is folded at 44 at the same side (the left-hand side in the figures).

The position A is such, in the present instance, that the pick-up elements 40 will extend downwardly for about a quarter or half inch below the level at which the upper surface of the fabric piece lay before the pick-up head was moved into position A. In order, however, to prevent too great penetration into the fabric in any given instance, and particularly to assist in preventing the picking up of two layers or pieces at the same time, there is provided (along with suitable cushioning means—for example that hereinafter described) either on a stationary jaw or on each jaw, as exemplified, a block portion or a blocking element which protrudes to a lesser extent than the pick-up element or elements 40. Desirably, the blocking elements and the pick-up elements are relatively vertically adjustable. In the present instance a blocking element 45 is mounted for vertical adjustment at 45a on the pick-up head and a blocking element 46 is mounted for vertical adjustment at 46a on each of the movable jaws 38.

In the present instance each of the movable jaws 38 is slidable toward and away from its respective jaw 39 on pins 48 carried on the latter and is mounted on the armature 49 of a solenoid 50 and normally held away from the jaw 39 by a spring 52 pulling the member 49 outwardly (to the left, as shown). The pick-up units 35 and 36 carry, respectively, limit switches 55 and 56, each activated by a rod 57 which contacts the fabric piece (slightly in advance of the jaws in the present instance) as the pick-up head moves into position A and energizes its solenoid 50 to move its armature 49 and its jaw 38 to the right (FIG. 4). Preferably and as exemplified, the switches 55 and 56 are arranged in series in a circuit which energizes the solenoid 50, so that operation of both rods 57 to close both switches will be necessary before either set of jaws will grip the fabric. In this way, even tho one portion of the fabric protrudes upwardly further than the other, or even tho the stack is misplaced, a single set of jaws cannot be operated alone. In this manner, the picking up of the fabric piece at both sides in a uniform manner is assured whenever a fabric piece is picked up at all. Plates 57a may be provided adjacent to the respective rods 57 to level off the fabric near the rods.

As will be seen, there is a slight period of dwell when the arm 24 and the link 23 are substantially in line which allows time for the jaw 48 to move and for the upper layer of a folded fabric piece (or the single layer of an unfolded fabric piece) to be gripped by the jaws. Once this period of substantial dwell is over, however, the crank 24 moves the head 20 to the position B, slightly in advance of which point normally closed limit switch 58 is contacted and opened by arm 24 which results in deenergizing solenoids 50 so that the springs 52 will separate the jaws 38 from the jaws 39 and cause the piece of fabric picked up by these two sets of jaws to be released and dropped on a suitable surface such as that provided by the endless conveyor 60 exemplified. On this conveyor the pieces may be conducted one by one to a sewing machine, a restacking depot, or other place of further handling. The conveyor is driven by suitable means (not shown) at a suitable constant speed from the same source of power as the shaft 25. It will be appreciated that when the fabric piece is dropped on the conveyor, the fold made by the jaws should lie forwardly, and preferably with the greater portion of the fabric piece flat on the conveyor. To this end, the part hanging from the jaws should be caused to trail away (FIGS. 8 and 9) from the direction of movement of the head 20 from position A to position B. This can be effectuated by the interposition of an element in the path of movement of the hanging portion of the fabric piece. While such an element may be the conveyor itself if it is not moving at too great a speed, there is provided, in the present instance, a sheet of metal 62 which curves upwardly behind position A and, in the present instance, extends almost to the rear turn of the conveyor 60.

In order that the head, as it repeatedly moves to position A may properly engage the fabric, it is important that the upper surface of the uppermost fabric piece be in the general vicinity of a horizontal plane slightly above the lower points to which the elements 40 and 45 on the head will move, and that the fabric piece be pushed down as by the elements 40 and 45. When the stack is high, the stack itself may yield considerably; but when it is low, some other cushioning means is necessary. In the present instance, there is provided a cushioning means which will permit some yielding even when the stack is high, and more when it is low, up to, for example, one inch, and provides a substantially constant pressure between the head and the fabric each time the head engages the fabric.

The stack 43 is supported on a table 63 thru the medium of a foam rubber suction 63', or a new stack may be put in place while there are still a few fabric pieces on the table. The table 63, in turn, is supported for vertical movement thru the medium of a piston 64 the stem 65 of which is slidably mounted at 66 in the frame 10, and the head 67 of which slides within a closed cylinder 68 carried by the frame. Air (or other gas) under a cushioning pressure is introduced below the piston from a pipe 69 controlled by a normally closed valve 70 and regulated by a gate valve 70a, and above the piston head by a pipe 71 controlled by a normally closed valve 72 and connected with an outlet pipe 73 with a normally closed pressure-relief valve 74 having an adjustable bleeder end 75 which, as exemplified, is adjusted for total opening of the pipes 73 and 71. As will be seen, when the valves 70 and 74 are opened, the table 63 will be moved upwardly. The setting of the bleeder end 75 should be such that the air above the piston head 67 will be exhausted at least fast enough (much more than fast enough, as exemplified) to compensate for the removal of the fabric pieces one-by-one from the stack 43 and to cause the table to rise between one movement of the pick-up head to position A and a successive (but not necessarily immediately successive) such movement thereof at least enough to bring the now uppermost layer to a position in the general vicinity of the position which the just removed layer has occupied. When, as exemplified, the table moves upwardly at a faster speed than enough to compensate for the removal of the fabric pieces, the upward movement will open a limit switch 76 to close the valves 70 and 74 (while the valve 72 and a normally closed relief valve 77 from pipe 69 remain closed) when the upper surface of the uppermost layer of fabric on the stack moves the switch arm 78 of the switch 76, which arm is set to move when the fabric has compressed to a given degree under it, as, for example, three-eighths of an inch. Thus, as fabric pieces are removed, the table 63 and the stack 43 will rise whenever the upward pressure on the switch-arm 78 is sufficient to operate the switch 76, so as to bring additional fabric pieces one-by-one to the same horizontal plane or to occasionally bring the top of the stack to the general vicinity of such a plane (as may be desired) for convenient pick-up by the head 20 and withdrawal by the withdrawal means comprising the beam 12 and the head 20. Some depression of the top layer of the stack by the jaws is desirable in order for them to grip the fabric effectively, so that the switch arm 78 should be arranged to be operative only when the top of the stack lies above the lowest position of the jaws. Action of the limit switch 76 is replaced, or substituted for, before the head 20 depresses the top of the stack, by the activation of a switch 79 by the arm 24, which switch 79 performs a similar function to the function of the switch 76, but is independent of the action of the head on the stack.

When the table itself rises to an extent such that all or most of the fabric pieces of a stack thereon have been removed therefrom, the table will contact a limit switch 80 to open valve 72 and relief valve 77 (which has a controlled bleeder end 81 similar to the end 75), and to close valves 70 and 74, to permit the piston and table to drop under control of valve 81 to a position wherein a new stack, such as that shown at 43a, may be placed on the table. The activation of the limit switch 80 also causes the circuit of the motor 29 to be broken to discontinue movement of the beam 12. The switch 80 should be operative while there is still some depressible support, such as a few fabric pieces, between the table and the operative position of the jaws. As soon as the new stack 43a is properly in place on the table, a push button 82 may be pressed to restore the valves to their normal positions and to cause the circuit of the motor 29 to again be closed. An additional push button 83 may be provided to perform the function of the switch 80 when necessary at any time.

The pipes 69 and 71 are supplied thru a pipe 85 when a gate valve 86 is open. Pipe 85 extends to a main airpressure supply line 87 which also supplies a pipe 88 when a gate valve 89 is open. The pipe 88 is controlled by a normally closed valve 90 which is opened in response to the closing of a switch 91 by crank arm 24 to supply air to a pipe 92 and a pipe 93. Air flows thru pipe 92 to discharge nozzle 94 pointed slightly downwardly from a position above and to that side of the stack where the folds appear so as to blow between the piece of fabric being lifted and the top layer of the piece below it. As will be seen in FIG. 7, this air discharge is timed to occur, in the exemplified operation, at a time when the head has lifted the upper layer of the uppermost fabric piece and part of the lower layer of the uppermost fabric piece, so as to assure that the right-hand side of the upper layer of the next-to-uppermost fabric piece will not stick to the lower layer of the uppermost fabric piece and be pulled up therewith. (It is to be noted that the left-hand side of the next-to-uppermost fabric piece is folded and therefore has twice the weight of the free right-hand side, so that, in many cases, it will easily separate itself from the uppermost fabric piece.) At the same time air is blown thru pipe 93 to discharge nozzle 95 which directs air downwardly upon the released fabric piece as it is moved beneath the nozzle 95 by the conveyor 60 to arrange and smooth the fabric piece as it passes thereunder, the timing, and the position of the nozzle 95, being such that one fabric piece will be passing under the nozzle 95 at the same time that another fabric piece is being lifted off the stack by the head 20. In the exemplified operation, the fabric—tho the original fold has been unfolded—will now carry a small flap 96, folded by the pinching action of the jaws, and now pointing rearwardly of the direction of movement of the conveyor surface on which the fabric piece lies; and the jet of air from the nozzle 95 is first ejected after the rear (free) end of the flap 96 has passed beneath the nozzle, so that the spreading fan of air above the surface will bend the flap forward and straighten and smooth the fabric. Moreover, by timing the jet to occur just when the original fold 44 is under it, the fabric may be smoothed away from the fold line.

The air pressure normally provided beneath the piston head serves as a cushion which yields as the head 20 swings into contact with the top of the stack, and facilitates the gripping of the top layer without gripping the second layer.

In order to open the respective valves 70, 72, 74, 77, and 90, they are respectively provided with solenoids 100, 102, 104, 107, and 110. The circuitry for operating these, the solenoids 50, the motor 29, and other electrical elements comprises main leads 112 and 113 (FIG. 6). From the lead 112 there extend in parallel lines 115 and 116. Normally open switches 55 and 56, are inserted in series in line 115. Normally open hold-in contacts 118, which are closed by the energization of coil 119, are inserted in line 116 for maintaining the solenoids 50 energized until the limit switch 58 is opened by the arm 24. The lines 115 and 116 meet in a line 120 which extends to the lead 113 in which there are inserted in parallel one solenoid 50, the other solenoid 50, and coil 119 for closing contacts 118; and, in a further portion of the line 120, normally closed limit switch 58. A line 124 having inserted therein normally open switch 91 and solenoid 110 for closing it, also runs from lead 112 to lead 113. To a conducting element 126 parallel lines 128 closable by normally open contacts 129 under control of push button 83, 130 closable by normally open switch 80, and 132 containing contacts of table-down hold-in contacts 134, run from lead 112; and from element 126 parallel lines 136 containing solenoid 102, 138 containing solenoid 107, and 140, run to lead 113. Line 140 contains the coil 142 of the hold-in switch 134 in addition to a normally closed switch 143 openable by push button 82. Thus, the closing either of switch 80 or of manually operated switch 129, will not only open valves 72 and 77, but will also energize coil 142. The energization of coil 142 will close contacts of switch 134 and will at the same time open normally closed contacts of contacts 144. A line 145 containing the contacts of switch 144 energizes the motor 60 when switch 144 is in its normally closed position, and stops the machine when it is open. Thus the opening of switch 143 will result in starting up the machine again, as well as in permitting the closing of valves 72 and 77. Solenoids 100 and 104 are in parallel lines 146 and 148 respectively running to lead 113 from line 150 running from lead 112 and containing normally closed switch 151 (which is opened by the energization of coil 142), switch 76 and switch 79; and thus valves 70 and 74 will be open only when switch 151 is in its normally closed position and when switches 76 and 79 are also held in their normally closed position.

Various types of gripping means may, of course, be employed, as may various jaw arrangements. One type of jaw arrangement is one in which the bite is adjustable to give the most effective action for a particular functional grip activity and/or a particular pressure of the jaws on the fabric surface, as, when desired, to retract the bite of the jaws to an amount which will limit or avoid tendencies for a second layer of fabric to be picked up by the jaws. With the foregoing and other ends in view, there is exemplified in FIG. 10 an alternative form of jaw construction and arrangement. A pick-up head 20a carries jaws 38a and 39a at least the former of which, and in the present instance both of which, are provided at their lower ends with roughened surfaces formed in the present instance by gluing sheets 160 of sandpaper to their lower surfaces so that the grains 161 of sand protruding therefrom will frictionally engage and, to a certain extent, penetrate the topmost layer of fabric on a stack. The jaws 38a are, like the jaws 38, mounted for sliding movement on pins 48a in response to the movement of the armatures 49, which pins are mounted for rotative but not longitudinal movement with respect to the jaws 39a by means of an annular protrusion 164, and carry further portions threaded at 166 which are threadedly mounted at 167 in the head 20a, and are rotatable by screw heads 168. Thus, the jaws 39a, instead of being fixed to the head 20a, are adjustable toward and away from their respective jaws 38a to control the distance between the jaws of each pair when open, and, consequently, to control the extent of the bite of each pair of jaws.

In certain of its more specific aspects, the invention contemplates the provision of pick-up means comprising an element which is swung on an axis to perform a gripping action and/or to move a layer or piece of fabric from its position on the top of a stack. In addition to the advantages possessed by other embodiments of the invention, arrangements of this nature are advantageous in assuring that only one layer (or other predetermined number of layers) will be picked up at each operation of the pick-up means, and in providing an operation which is effective with a specially wide range of thickness of fabric as, for example, jersey knit cottons and cotton blends from 24's thru 34's. While the simplest form of a pick-up element which is swung on an axis is a cylindrical element which is formed with a roughened surface and is swung on its central axis thru a partial rotation, various other forms of arrangements, including a dependent blade pivoted at an upper point, an element constituting a segment only of a cylinder, an arcuately-movable cylindrical or segmental brush, an element which in cross-section is in the form of an ellipse or of a portion of an ellipse, various eccentrically formed or operated elements, and elements swinging thru more than a partial rotation, may be used. Preferably in most instances such elements may be used as one of a pair of jaws and serve to pinch the fabric against either a stationary or complementally movable jaw, but such elements have the additional advantage of being usable to lift (or to lift and move to a remote point) one or more layers by the mere adherence of the fabric to the roughened (or serrated) surface of an element swingable on its axis.

Figure 11:
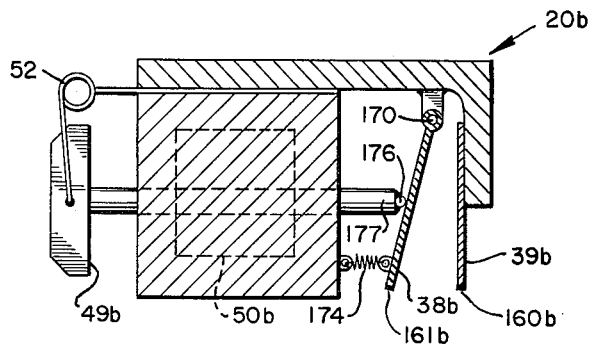

There may, for example, be provided a pick-up means embodying a pick-up element swingable on an axis, with a resulting positive action in separating the top layer of a stack of fabric pieces from the layer below it by a slight separative movement of the engaged portion of the top layer, and by a particularly effective holding action with or without a pinching action. In FIG. 11 there is exemplified mechanism arranged to effectuate a pinching action. As here exemplified, the mechanism comprises a pick-up head 20b carrying a stationary jaw 39b and a jaw 38b swingable on a pivot. The jaws have fabric-engaging portions 160b and 161b composed of sandpaper on their lower surfaces. The jaw 38b is hung on a rotatable rod 170 to swing on the axis thereof. Its end is swung to the right (FIG. 11) against the pull of a spring 174 by pins 176 on the arm 177 of armature 49b. When the solenoid 50b is operated, the lower end of the jaw 38b moves a portion of the upper fabric layer to the right with it and pinches an extent of it against the jaw 39b.

In certain instances it is advantageous that the picked-up portion of a fabric may, on release, be ejected in a controlled manner, as in the direction of movement of a conveyor onto which the fabric piece drops, and such a result may be achieved by moving a pick-up element laterally and upwardly as along the surface of another element against which the fabric piece is pinched or on a roughened surface of the pick-up element itself, as over a curved surface thereof as it is swung on its axis.

In FIGS. 12–19 there is shown a particularly simple and effective form of mechanism comprising a rotatable pick-up element having at least a portion formed with a roughened surface as of sandpaper, relatively sharp knurlings or other fabric-moving protuberances, soft rubber, sponge or foam rubber or plastic, etc., and being swingable on the axis of the rotatable element, as the latter rotates, to move a fabric portion to a position from which it may be ejected in a controlled direction as a part of a releasing action. In the present instance there is provided a pick-up means 20c comprising a movable pick-up element or jaw in the form of a rotatable cylinder 38c having a surface of sandpaper 181 (which in the present instance carries sixty grit silicon carbide adhesive) along at least a fabric-engaging portion of its periphery (all of its periphery in the present instance). Spaced sufficiently from the surface of the element 38c for the gripping of a fabric therebetween and generally parallel to a tangent thereto is a surface 182 of a stationary plate-like jaw 39c which is adjustably mounted on a bracket 184 by screws 185 each extending thru a slot 186 in element 39c and extending from left to right in FIG. 12. It is to be noted that, as contrasted with the two gripping units 35 and 36 used in tandem, the jaws 38c and 39c are sufficiently elongated so that only a single gripping unit is provided. The top of a stack of T-shirt sleeve blanks may be depressed, for example, from one-eighth inch to one-half inch. Sandpaper of various grades may be used. Papers carrying silicon carbide abrasive of thirty grit, sixty grit, one hundred grit and five hundred grit, and alumina abrasive of thirty-six grit and one hundred and fifty grit have, among others, given satisfactory results. In general it may be stated that the coefficient of friction between the operative surface of the pick-up element and the particular fabric picked-up should be greater than the coefficient of friction between two layers of the fabric.

Figure 12:
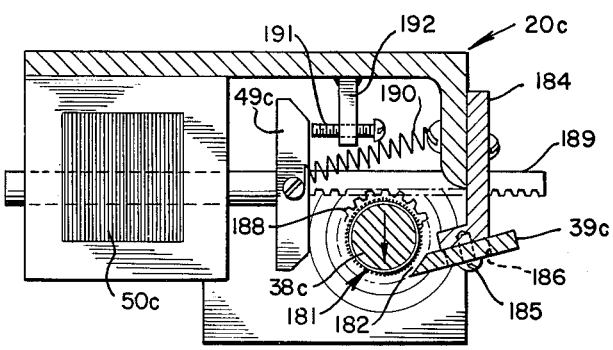
Figures 12A, 12B, 12C:
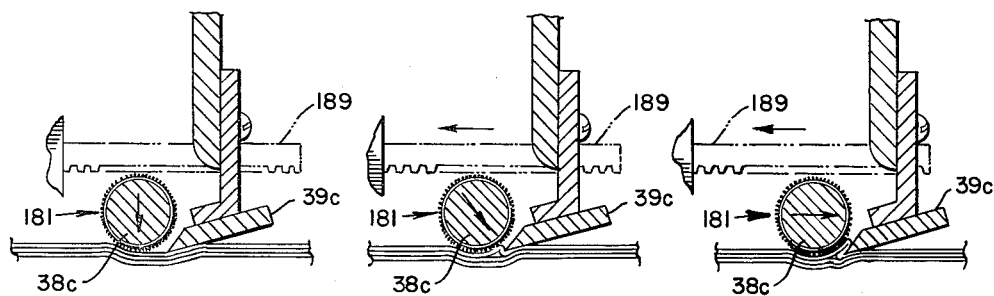

Element 38c is rotatable thru the medium of a gear 188 meshing with a rack 189 which is drawn to the left (FIG. 12) by armature 49c against the pull of a spring 190 so as to rotate the rotatable element 38c counter-clockwise (thru 90° for example) so as to bring laterally and upwardly a transversely extended portion of the fabric originally engaged by the sandpaper at the bottom of the rotatable element to a position to the right above the surface 182 where it will be pushed between the rotatable element 38c and the stationary jaw 39c. As shown in FIGS. 12a, 12b, and 12c, the rack 189 is mounted on the armature 49c of solenoid 50c (only a single one of which is provided). The extent of the movement of the armature 49c may be limited by adjustable stop screws 191 on stop blocks 192. As exemplified, there are suitably mounted, as from the solenoid 50c, downwardly-extending rods 57c which operate switches 55c and 56c, respectively. The rotation of the jaw 38c moves a portion of the fabric layer between itself and the jaw 39c to grip it for removal from a stack. A mechanical cushioning means, such as the foam rubber pad (as shown at 63') may be placed on the stack-support 63c to provide the same yieldability at the bottom of the stack as at its top. The mechanism shown in FIGS. 12-14 may be carried by suitable mechanism such as that exemplified in FIGS. 1-9 to perform operations as indicated in FIGS. 15-19 or may be utilized in connection with mechanism such as shown in FIGS. 31-33, or may be otherwise used as desired. It is to be noted that a clockwise rotation of element 38c under the influence of spring 190 not only effects the release of the fabric piece but also provides an ejecting action which gives the gripped portion of the fabric piece a forward movement with respect to the upper surface of a conveyor 60c.

One of the advantages of pick-up means as exemplified in FIGS. 12-19 is that the pick-up movement has a upward as well as a swingable component. This advantage may be achieved in other manners, however; as by means such as exemplified in FIGS. 20-21 wherein there is provided a jaw 38d extending downwardly and somewhat to the right and movable in a straight diagonal line extending to the right and somewhat upwardly against a jaw 39d. The fabric is pushed as indicated between the downwardly diagonal surface 195 of an element 40d on the jaw 38d and a conforming surface 196 on jaw 39d. The armature 49d, arm 177d, and solenoid 50d are tipped in the present instance, so as to mount and move the jaw 38d at an angle to the top of the stack.

In certain instances two pick-up elements which are rotatable or otherwise swingable on their axes may be employed. Such an arrangement is shown in FIG. 22 wherein there is provided mechanism such as shown in FIG. 12 except that the stationary jaw 39c is omitted and replaced by a rotary jaw 39e similar to the rotary jaw 38c and adjustably mounted (similar to the jaw 39c) so as to have its periphery spaced from the periphery of the jaw 38c and driven by a gear 197 meshing with the driving gear 188c of element 38c meshing with a special rack portion 198 on rack 189e. The two rotary jaws are pressed against the top of the stack together, and the solenoid operated to cause them to move two fabric portions toward each so as to form a fold which is gripped between the nip of the rotary jaws 38c and 39e.

While there are numerous advantages, in many instances, in the provision of means which pinches the fabrics so that it can be withdrawn with certainty even against resistive forces, there are other instances in which a pinching action is undesirable or unnecessary. In such instances a movable pick-up element such as exemplified in FIG. 12 (and, in some cases, in FIGS. 11 and 20 provided that the stationary jaws and their supports are omitted) will function highly effectively, particularly if the extent of the pick-up movement is greater than heretofore exemplified, e.g. 180° (the amount depending on the clinging characteristics of the surfacing on the pickup element and of the fabric piece to be picked up). One such arrangement is disclosed in FIGS. 23-25 wherein the mechanism is the same as that exemplified in FIGS. 12-19 except that the jaw 39c and its retaining bracket 184 are omitted and the parts are arranged to give a 180° rotation to the pick-up element 38c. As will be seen from FIG. 24 the fabric is effectively picked up, and as will be seen from FIG. 25 it is in the process of being effectively ejected to release the same with a forward movement.

A large number of types of surfacings may be provided for a broad-faced pick-up element movable on an axis (or otherwise in some instance) — even, in certain cases, a surface which is roughened only to a small extent but which is used with means exerting so much pressure on the fabric thru it that the very pressure provides the necessary frictional pick-up action. On the other hand, a movable pick-up element in the form of a rotary or other brush gives satisfactory results in certain instances. In FIG. 26 there is exemplified a rotary pick-up element 38f which carries bristles 200 extending radially from part (as exemplified) or all of its periphery to move the fabric and to pinch it between itself and a stationary jaw 39f which is in the form of a sheet metal shield mounted at its ends to frame pieces in a suitable manner (not shown) and serving additionally, together with a complementary shield 201 at the other side of the element 38f, to limit the penetration of the bristles into the fabric.

In FIG. 27 there is shown an arrangement which is similar to that of FIG. 26 except that the stationary jaw 39f and the member 201 are omitted and are replaced by a rotary jaw 39g similar to the jaw 38f in construction and similar to the rotary jaw 39e in operation, it being noted, however, that it is often practical to have the jaws 39f and 39g closer together than is the case with the jaws 38c and 39e.

As will be appreciated there are many instances wherein a jaw having a non-circular or non-arcuate operative surface will have some or all of the advantages of one having a circular or arcuate surface, and in some cases may have additional advantages, as, for instance, in picking fabrics having a particularly smooth surface such as nylon tricot, acetate tricot, etc. There is shown in FIG. 38 an arrangement similar to that of FIG. 12 except that, instead of the rotary element 38c, there is provided an element 38h which is elliptical in cross section and is mounted to swing on an eccentric axis 205 which is so positioned that the lower (far) portion of the ellipse may be pressed into the fabric to move it to the right (FIG. 28) and to lift it between the far portion of the eccentric jaw 38h and the surface 182 of the stationary jaw 39c to pinch it therebetween.

There may, of course, be employed a wide number of types of gripping arrangements embodying the principles of the invention in its broader aspects. For example, the arrangement shown in FIG. 29 is similar to that of FIGS. 1-9 except that, in addition to the pair of jaws 38 and 39 there is provided a third jaw 210 movable against the jaw 38 when the armature arm 177i moves to the right. Springs 211 and 212 (preferably two of each) serve to normally separate the respective pairs of jaws. In this manner there are two opportunities to pinch the fabric regardless of its lie. In addition a milder pinching action may be provided at two points than at one, so as to reduce any tendencies toward undesired creasing. By providing the springs 211 and 212, the movement of the jaws 38 and 210 to the right is also limited to assure a relatively mild pinching action.

The closeness of the bite of the jaws can also be limited in other manners. For example, in FIG. 30 there are provided a movable jaw 38k and a stationary jaw 39k having sandpaper-covered lower surfaces 161k and 160k, respectively. A block 215 fixed to jaw 39k limits the movement of the jaw 38k to the right (FIG. 30) so as to limit the tightness of the maximum pinch between the jaws as well as the amount that the fabric goes up between the jaws and hence the amount of fabric gripped. The block 215 may, of course, be adjustably mounted, if desired.

Figure 34:
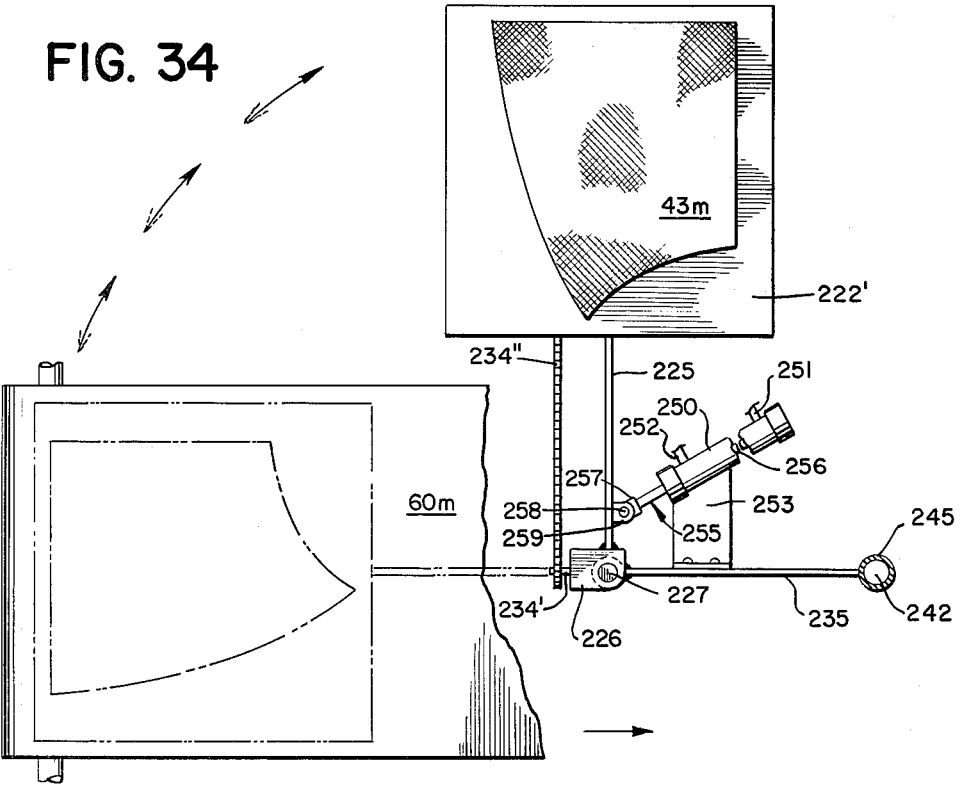
FIG. 34 is a sectional view on the line 34—34 of FIG. 33.

As will be appreciated, there are various instances in which the relative movement of a pick-up means and a stack-supporting means (in order to bring about the withdrawal of the fabric from the stack and the deposition of it, as on a conveyor) may involve the provision of a displaceably-mounted stack-supporting means operatively associated with a fixedly mounted pick-up means. One such arrangement is exemplified in FIGS. 31–34 wherein there is provided a pick-up head 20m similar to the head 20c except that its frame member 220 is fixedly mounted from a ceiling portion 221 by a fixed beam 222. Movable under the pick-up means 20m is a stack-supporting member 63m, carrying a foam rubber bottom 222' for the stack 43m, and carried by means of a pin 223 fixed to it and to a sprocket 224 thereon. The pin is rotatably mounted on one end of an arm 225 mounted for swinging movements on both vertical and horizontal axes. The arm 225 is mounted by a bracket 226 which is mounted on bearings 227 on a generally vertical post 230 for swinging movement on the generally vertical axis of the post 230. The post 230 is itself pivoted for swinging movement on the horizontal axis of a pin 231 fixedly supported by a fixed upright 232 on saddle 233. A sprocket 234 is fixed to a pin 234', fixedly mounted from bracket 226 on the same horizontal plane as the axis of pin 231. A chain 234'' connects the sprockets 224 and 234 so as to maintain the support 63m in a generally horizontal plane in the same manner that the head 20 is maintained in a particular relationship to the horizontal by means of sprockets 14 and 16 and chain 15. Also mounted on the post 230 is an arm 235 pivoted by means of lugs 236 on a horizontal pin 238 carried by block 240 on the lower end of the stem 241 of piston 242 in air cylinder 245 which provides a cushion for the upward movement of the support 63m as well as operating means (including air connections 246 and 247) for moving it upwardly and for controlling its vertical movement in both directions. Such operating means may be arranged to effect desired operations, including those set forth below, in manners which will be readily apparent to those skilled in the art in view of the above descriptions. Cylinder 245 is hung from a ceiling piece 248 by a pivotal mounting 249. The arm 225 is swingable on the axis of the post 230 from the position shown in FIG. 31 and in dot-and-dash lines in FIG. 34 to the position shown in FIG. 33 and in full lines in FIG. 34 by air cylinder 250 having air connections 251 and 252 mounted on arm 235 by plate 253 and containing a piston 255 the stem 256 of which is secured to a block 257 carrying vertical pin 258 rotatable in lugs 259 on arm 225. Beneath the head 20m and at below the level of the arm 225 and its associated mechanism, and, in the present instance under the saddle 233, there is provided a conveyor 60m on which there may be dropped a piece of fabric after it has been picked up by the jaws 38c and 39c of the head 20m and after the stack-support and the stack have been removed from the position of FIG. 31 and the piece released and ejected by the reverse movement of the rotary jaw 38c.

There is exemplified below one type of operation of the mechanism shown in FIGS. 31–34. Assuming that the parts are in the position shown in FIGS. 33 and 34, and that the movement of the stack support 63m has tripped a delayed-action actuating means for the piston 255 or that a manual tripping means is employed and operated, and that air is supplied to the face of the piston head thru connection 251, the stack-support and its stack will move into the position of FIG. 31. Air is then admitted to the cylinder 245 thru the connection 246 to depress the (right hand) end of the arm 235 and consequently to raise the stack support 63m to push the top of the stack upwardly against the jaws 38c and 39c, as shown in FIG. 32, whereupon the jaw 38c is rotated to pinch a portion of the upper layer of fabric between it and the opposed surface of jaw 39c. The air pressure for cylinder 245 is then reversed so that air will enter by connection 247 to return the stack support to the position of FIG. 31, whereupon reversal of air supply for cylinder 250 will admit air thru connection 252 and move the stack support back to the position of FIG. 33. By push-button controlled means, or by means including a trip member (not shown) operated toward the latter part of the latter movement of the stack support, a reverse operation will then be imparted to the rotary jaw 38c, which will release and eject the fabric piece so that it will fall on the conveyor 60m while the stack support is out of the way, and in a position with its flap 96m in position to be straightened out by means similar to that shown at 95.

Figure 35:
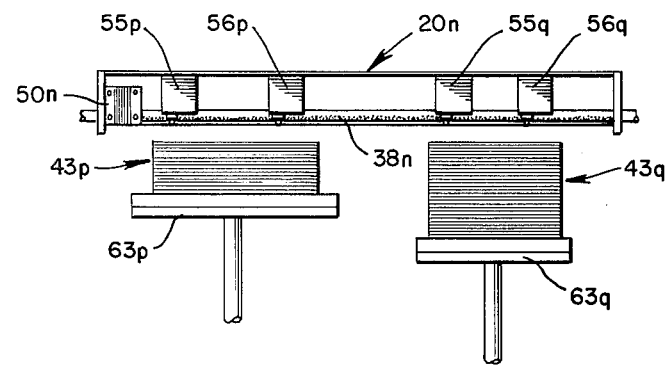
FIG. 35 is an end view of an arrangement for simultaneously picking up fabric pieces from a plurality of stacks and depositing them on a single conveyor.

Arrangements such as illustrated permit ready modification to obtain wide variations in use. For example, a single pick-up means may be arranged to pick up material from a plurality of stacks and deposit them on a single conveyor. For example, as shown in FIGS. 35 and 36, there may be substituted for the pick-up head 20 a pick-up head 20n comprising two pairs of switches 55p and 56p, and 55q and 56q, and a solenoid 50n adapted to be operated (to operate the rotatable jaw 38n) when all four of the switches 55p, 56p, 55q, and 56q have been closed. Beneath the switches 55p and 56p (when the head 20n is in a right hand position—FIG. 36) is a stack support 63p which is constructed and operated similarly to stack support 63 and which may support a stack 43p similar to the stack 43. Beneath the switches 55q and 56q (when the head 20n is in a right hand position—FIG. 36) is a stack support 63q which is supported and operated similarly to the stack support 63 but independently of the support 63p, and which may support a stack 43q which is (from the top) a mirror image of stack 43p. After pieces 42p and 42q of the fabric have been picked up from the top of their respective stacks by the pick-up head 20n, and the unit 259 has been swung to the left (FIG. 36), these fabric pieces 42p and 42q may be released by the head 20n, onto a single conveyor 60n on which they will lie side by side. Each fabric piece may be flattened out as by means such as the air nozzle 95, and may be conducted by the conveyor 60n into position to be respectively operated on by suitable mechanism 260 and 261 as, for example, sewing machines.

Similarly a plurality of pick-up means may be employed to pick up fabric pieces one-by-one from a single stack, one such means being exemplified in FIGS. 37–38. As shown this means is arranged for picking up single unfolded pieces of non-tubular fabric. In this arrangement there is provided not only a pick-up head 20r similar to the head 20c and carried on a beam 12r constructed and operated similarly to the beam 12; but also a pick-up head 20s similar to the head 20c and carried on a beam 12s constructed and operated similarly to the beam 12 except as a mirror image thereof, and except that its operation will be so synchronized with that of the beam 12r that the head 20s will be in pick-up position when the head 20r is in release position and vice versa. The head 20r will release fabric pieces 42 onto the surface of a conveyor 60r and the head 20s will release fabric pieces onto the surface of a conveyor 60s moving in the opposite direction in the present instance. One advantage of an arrangement such as shown in FIGS. 37–38 is that the pick-up operations may proceed at twice the speed that they would if only a single pick-up means were employed, while the conveyors 60r and 60s move at the same speed as the conveyor 60.

As a specific example of fabric pieces adapted to be separated from a stack pursuant to the invention, mention may be made of 100% delta cotton fabric knitted from 30's yarn on a circular knitting machine having twenty-eight needles per inch, and knit thirty-six courses per inch, and finished forty-two courses per inch. Good results have been obtained when these are knit thirty-two and finished thirty-two courses per inch, and when 34's are knit thirty-nine and finished forty-six courses per inch. Similarly good results have been obtained from blends of cotton with plural-filament nylon (regular or stretch), mono-filament nylon, Dacron, California cotton, Egyptian cotton, Pima cotton, and mercerized cotton, among others.

Since certain changes in the constructions set forth and in carrying out the above process, which embody the invention, may be made without departing from its scope, it is intended that all matter contained in the above description or shown in the accompanying drawings shall be interpreted as illustrative and not in a limiting sense.

We claim:

1. Mechanism for separating fabric pieces from a stack thereof, comprising withdrawing means movable toward and away from the top of a stack, actuating means carried by the withdrawing means for pressing against the upper surface of a fabric piece at the top of the stack, means carried by said withdrawing means to pick up a portion of such fabric piece and comprising at least one element having a curved friction surface engageable with such upper surface and movable in a direction having a component parallel to such upper surface, means to move said withdrawing means into fabric-engaging position, means to move said friction surface in said direction in response to the inter-action of the resistance of the stack and the pressure of said actuating means, means to move said withdrawing means from a fabric engaging position to a position remote therefrom, and means to cause a releasing action of said pick-up means when the withdrawing means is in said remote position.

2. Mechanism as in claim 1 wherein there are provided means for independently supporting a plurality of stacks each with its upper layer in substantially the same plane, a single pick-up means for the stacks thus supported, said pick-up means being carried by a single withdrawing means, and means repeatedly to associate said withdrawing means and one of said supporting means for engagement of a fabric piece on one stack by said withdrawing means, and repeatedly to associate said withdrawing means and another of said supporting means for engagement of a fabric piece on another stack by said withdrawing means intermediate the engaging action on the fabric of said one stack.

3. Mechanism as in claim 1 wherein there are provided a plurality of conveyors, and a withdrawing means individual to each conveyor for withdrawing a fabric piece from the top of a single stack, each withdrawing means being arranged to move a fabric piece to a remote position different from that to which any other withdrawing means removes a fabric piece for deposit on its individual conveyor and means to operate said withdrawing means in regular order with respect to each other.

4. Mechanism for separating fabric pieces from a stack thereof comprising a pick-up element having a curved friction surface, means to move said surface into contacting engagement with the upper fabric layer of a stack of fabric pieces and prior to movement of said layer with respect to the layers below it and to press said surface against said upper fabric layer, and means to turn said pick-up element to frictionally move said fabric layer with respect to a lower layer and to bring it into a removed position.

5. Mechanism for separating fabric pieces from a stack thereof comprising a pick-up element having a curved friction surface, means to move said surface into engagement with the upper fabric layer of a stack of fabric pieces and to press said surface against said upper fabric layer, means to turn said pick-up element to move said fabric with respect to a lower layer and to bring it into a removed position, pick-up means including said pick-up element, stack supporting means, and means to cause relative movement of said pick-up means and said supporting means to cause a fabric piece including said layer to be separated from a stack supported on said supporting means.

6. Mechanism as in claim 4 wherein said surface portion is formed on a cylindrical member and wherein said turning means is operable to turn said cylindrical member on its axis.

7. Mechanism for separating fabric pieces from a stack thereof comprising pick-up means adapted for moving laterally and upwardly a portion of the upper fabric piece of a stack thereof, and for holding the piece in the position to which it is moved, said pick-up means comprising a pick-up element having a fabric-engaging frictional surface and movable to engage said surface with a fabric piece and then to move said surface laterally and upwardly to take hold of a fabric piece when the pick-up means is in proximity to the stack, means to so move said pick-up element, means to support a stack during the operation of the last mentioned means, means operative thereafter while said pick-up element holds said fabric piece for causing relative separative movement of said pick-up means and said supporting means, and means operable after the operation of said causing means to bring about a reverse movement of said pick-up element to eject a fabric piece in a direction including the direction of said reverse movement.

8. Mechanism for separating fabric pieces from a stack thereof, comprising mounting means, a gripping element carried by said mounting means, an element also carried by said mounting means and movable toward and at least part way along a surface of said gripping element to draw a fabric portion along said surface and to grip it thereagainst, means for imparting such a movement to said movable element, and means to move said mounting means toward a stack of fabric pieces prior to the movement of said movable element, and means to move said mounting means away from said stack after said movement of said movable element.

9. Mechanism as in claim 8 wherein said movable element has an arcuately-extending operative surface.

10. Mechanism as in claim 9 wherein said gripping element has a surface slightly spaced from the last mentioned surface and generally parallel to a tangent thereof.

11. Mechanism as in claim 8 wherein means are provided for imparting a reverse movement to said movable element after the operation of the means for moving the mounting means away from the stack, whereby a fabric piece picked up in the earlier operations is ejected in a direction having as a component thereof the direction of said reverse movement.

12. Mechanism for separating fabric pieces from a stack thereof, comprising fabric gripping means, means to support a stack, means to cause relative movement of the stack-supporting means and the gripping means to cause the gripping means to engage the fabric piece at the top of the stack and to cause relative movement beyond the point of initial engagement, means responsive to the position of the top of the fabric piece to cause a gripping action of the gripping means when in engagement with such a top fabric piece, and means to cause relative separative movement of the stack supporting means and the gripping means.

13. Mechanism for separating fabric pieces as in claim 12 wherein said gripping means comprises an element having a portion with a sandpaper surface engagable with the upper surface of said top fabric piece and movable in a direction generally parallel to such upper surface.

14. Mechanism as in claim 12 wherein the gripping means comprises a pair of jaws and wherein there is provided means for adjusting the position of at least one of said jaws with respect to the other thereof to control the extent of bite of said jaws.

15. Mechanism as in claim 12 wherein the gripping means comprises a pair of jaws and wherein there is provided means for controlling the amount of fabric lying between said jaws when the engaging movement has proceeded beyond the point of initial engagement.

16. Mechanism for separating fabric pieces from a stack thereof, comprising fabric gripping means, means to support a stack, means to cause relative movement of the stack-supporting means and the gripping means to cause the gripping means to engage the fabric piece at the top of the stack, means to cause a gripping action of the gripping means when in engagement with such a top fabric piece, means to cause relative separative movement of the stack supporting means and the gripping means, said gripping means comprising a pair of jaws, and means for adjusting the position of at least one of said jaws with respect to the other thereof to control the extent of bite of said jaws, one of said jaws being a stationary element and the other of said jaws being arcuately movable along a surface portion of the same.

17. Mechanism for separating fabric pieces from a stack thereof, comprising fabric gripping means, means to support a stack, means to cause relative movement of the stack-supporting means and the gripping means to cause the gripping means to engage the fabric piece at the top of the stack, means to cause a gripping action of the gripping means when in engagement with such a top fabric piece, and means to cause relative separative movement of the stack-supporting means and the gripping means, wherein the means to cause relative engaging movement is arranged to cause relative movement beyond the point of initial engagement and there is provided adjustable means to control said movement-causing action.

18. Mechanism for separating fabric pieces from a stack thereof, comprising fabric gripping means, means to support a stack, means to cause relative movement of the stack-supporting means and the gripping means to cause the gripping means to engage the fabric piece at the top of the stack, means to cause a gripping action of the gripping means when in engagement with such a top fabric piece, and means to cause relative separative movement of the stack-supporting means and the gripping means, wherein there is provided, on said gripping means, means protruding therefrom and movable regressively upon engagement with the fabric, and means responsive to the regressive movement of said protruding means to activate said gripping-action-causing means.

19. Mechanism as in claim 18 wherein a plurality of spaced protruding means are provided and wherein said activating means is operable only when a plurality of protruding means are movable regressively.

20. Mechanism for separating fabric pieces from a stack thereof comprising stack supporting means, a separating head, means for causing relative movement of said supporting means and said head to bring the top of the stack and the head toward and away from each other, a pair of jaws carried by said head, at least one of said jaws being adapted to freely engage the upper surface of a fabric piece at the top of the stack and being movable toward the other of said jaws in a direction having a major component parallel to said upper surface and being formed to grip the engaged fabric piece against the other of said jaws, actuating means carried by said head and operable in response to pressure thereof against said upper surface, means to cause relative movement of said supporting means and said head to cause said actuating means to be pressed against such fabric piece and said one of said jaws to engage such fabric piece, and means operable in response to the operation of said actuating means to move at least one of said jaws toward the other thereof.

21. Mechanism as in claim 20 wherein said one of said jaws is formed with fabric-penetrating means for extending beneath the surface of the engaged fabric piece.

22. Mechanism for separating fabric pieces from a stack thereof comprising vertically movable means to support a stack, gaseous pressure means to move the supporting means upwardly, means to successively remove fabric pieces at timed intervals from the top of the stack and including a removal element movable downwardly against the fabric pieces and below the plane of the upper surface thereof, and means to move said supporting means upwardly after at least certain of the actions of the removing means, and means to terminate any of a series of actions of said upwardly-moving means when such action has moved the supporting means upwardly substantially to predetermined level, wherein said terminating means is responsive to the height of the stack and wherein there is provided timed control means for replacing the action of said terminating means as said removal element moves downwardly.

23. Mechanism for separating fabric pieces from a stack thereof, comprising withdrawing means movable toward and away from the top of a stack, means carried by the withdrawing means for engaging the upper surface of a fabric piece at the top of the stack, means carried by said withdrawing means to pick up a portion of such fabric piece and comprising at least one element having a portion movable in a direction having a component generally parallel to the surface of a fabric piece, means to move said withdrawing means into fabric-engaging position, means to operate said pick-up means, means to move said withdrawing means from a fabric engaging position to a position remote therefrom, and means to cause a releasing action of said pick-up means when the withdrawing means is in said remote position, wherein said movable portion is formed with an extended convexly-curved fabric-engaging friction surface adapted to turn on an axis and said operating means is adapted to turn it on said axis.

24. Mechanism for separating fabric pieces from a stack thereof comprising a pick-up element having a curved friction surface, means to mount said element for movement of said surface through a curve into a position at one side of the original position of said surface, a second pick-up element toward which said surface moves during said movement and positioned and arranged for the pinching of a fabric piece between the first-mentioned pick-up element when so moved and said second pick-up element, means for imparting such movement to at least said first-mentioned pick-up element, and means to cause a relative separative movement of said mounting and said stack.

25. Mechanism for separating fabric pieces from a stack thereof comprising a fabric-withdrawal head having fabric gripping pick-up means depending therefrom, a swingable beam, means to pivotally support said head from an end portion of said beam, means to operate said beam to move said head upwardly and laterally from a position where said pick-up means will engage the upper surface of fabric piece on a stack thereof, means to cause a gripping action of the pick-up means when in such engagement, means to cause the release of said fabric piece by said pick-up means when the head has been moved to a remote position, and chain-and-sprocket means for so connecting said head to said beam as to maintain the pick-up means in the same attitude to the earth's gravitational pull at all times during the operation of the beam, the pick-up means, and the releasing means.

References Cited by the Examiner

UNITED STATES PATENTS

| 234,469 | 11/1880 | Griffith | 271—22 |
| 768,462 | 8/1904 | Juengst | 271—29 |

(Other references on following page)

UNITED STATES PATENTS

| | | | |
|---|---|---|---|
| 1,176,641 | 3/1916 | Barnett | 271—20 |
| 1,853,781 | 4/1932 | Rider. | |
| 1,912,724 | 6/1933 | Remington. | |
| 2,003,698 | 6/1935 | Remington | 271—25 |
| 2,348,821 | 5/1944 | Kauffeld | 271—69 |
| 2,570,288 | 10/1951 | Todd. | |
| 3,025,052 | 3/1962 | Gutteling | 271—28 |
| 3,064,968 | 11/1962 | Starnes | 271—19 |

M. HENSON WOOD, Jr., *Primary Examiner.*

J. N. ERLICH, *Assistant Examiner.*